Jan. 19, 1937.  C. J. BROWN  2,068,369
FAUCET
Filed Sept. 3, 1935
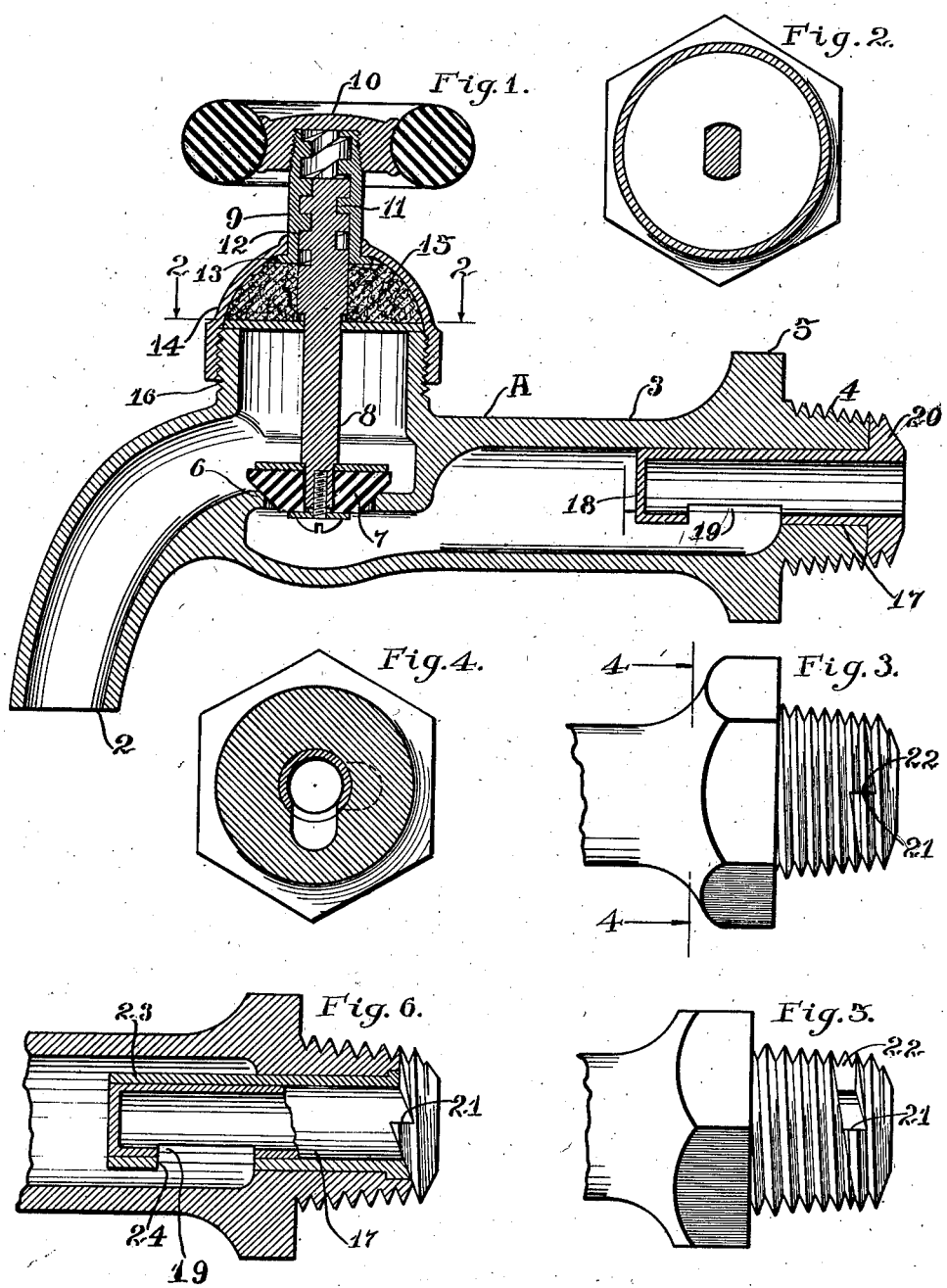
INVENTOR
Charles J. Brown
BY
ATTORNEY Patented Jan. 19, 1937

2,068,369

UNITED STATES PATENT OFFICE 2,068,369

FAUCET

Charles J. Brown, St. Paul, Minn.

Application September 3, 1935, Serial No. 38,899

2 Claims. (Cl. 251—95)

The present invention relates to improvements in faucets and more particularly to improved means for controlling the flow of the water through the faucet.

An object of the invention is to provide means in connection with the faucet whereby the water from the supply pipe may be shut off at the faucet, independent of the outlet control valve of the faucet to permit the faucet being worked upon, as in resetting the outlet control valve, etc.

A further object is to provide an improved form of co-operating outlet control valve which will permit a direct, positive seating of the valve.

These and other features of the invention will be more particularly set forth in the following description and the accompanying drawing, wherein:

Figure 1 is a vertical, sectional view of a faucet embodying my improvements.

Figure 2 is a sectional view on line 2—2 of Figure 1.

Figure 3 is an enlarged view of the inner end of my improved faucet, showing the faucet in an adjusted position to permit a free flow of water from the supply pipe.

Figure 4 is a sectional view on the line 4—4 of Figure 3.

Figure 5 is a view corresponding to Figure 3, but with the faucet parts in position to shut off the flow of water into the faucet from the supply pipe; and Figure 6 is a longitudinal, inner end view of the faucet, showing a modified construction of inlet control valve.

Referring to the drawing A represents the body of a faucet of usual construction having a discharge nozzle 2 and inlet end 3. The inlet is exteriorly formed with screw threads 4 to permit the faucet being screwed into a supply pipe, not shown, in the usual manner. The inner end of the faucet is formed with the usual squared portion 5 to receive a wrench to permit the faucet being screwed into or out of retained position in the supply pipe.

The faucet, intermediate the passageway of the inlet and discharge nozzle, is formed with the usual valve seat 6. An outlet control valve 7 for the faucet is supported upon the lower end of a spindle 8. The spindle 8 has threaded support in a sleeve 9, said sleeve supporting the handle 10 of the faucet. The threaded support between the spindle and sleeve consists of a spiral thread 11 upon the inner wall of the sleeve, intermeshing with the spiral groove 12 surrounding the spindle. The sleeve 9 in the construction shown in the drawing is formed with an outwardly bent flange 13 projecting into the cap 14, said cap having screw threaded support upon the faucet, as shown in Figure 1. The cap 14 is filled in the usual manner with packing 15, said packing resting upon the outwardly projecting flanged portion 16 of the faucet body.

In the inlet end 3 of the faucet body is fitted a sleeve 17 having a closed inner end 18, the sleeve being formed in one side with a port opening 19. The outer end 20 of the sleeve 17 forms a continuation of the inlet end 4 of the faucet. The sleeve 17 is rotatably supported within the inner end of the faucet and is formed with a squared portion or abutment 21, which in one position of the sleeve of the faucet will contact with the squared portion or abutment 22 of the faucet, and, as shown in Figure 3. In this position the port 19 of the sleeve communicates with the passageway through the faucet, permitting the free inlet of water from the supply pipe.

Referring to Figure 1 of the drawing, it will be noted that the sleeve fits closely against the upper, inner wall of the faucet with the inner end of the sleeve spaced upwardly from the bottom of the passageway through the faucet so that when the sleeve and faucet are in the relatively adjusted position shown in Figures 1, 3, and 4, the port opening 19 constitutes a passageway between the inlet end of the faucet opening and the passageway through the faucet, so as not to impede the flow of water.

When the faucet is given a quarter turn to the left with reference to the sleeve, as indicated in Figures 4 and 5, the port opening is turned out of communication with the passageway through the faucet, shutting off the flow of water from the supply pipe, permitting the valve 7 and supporting parts being removed for any necessary repairs.

The abutments 21 and 22 on the sleeve and faucet are in abutting relation to each other when the faucet is in the normal use position shown in Figure 1. The abutting shoulders are turned out of contact, as shown in Figure 5, when the faucet is turned to shut off communication with the supply pipe.

Figure 1 illustrates a sleeve 17 arranged in connection with an ordinary faucet body.

In Figure 6 is shown a faucet body specially constructed to co-operate with the inlet control sleeve. In Figure 6 a lining sleeve 23 is secured inside the faucet as a part of the inside of the faucet and the sleeve 17 turns in this lining sleeve. The lining sleeve shown in Figure 6 is formed with a port opening 24 to co-operate with the port opening through the control sleeve.

By means of my features of construction two important advantages are secured. First, with respect to the method of support for the valve stem. By means of the threaded connection between the stem and the handle supporting sleeve the valve stem, instead of being rotated is screwed downwardly in the turning of the handle to impart a direct thrust of the valve against the valve seat. This greatly conserves the life of the valve with respect to the ordinary constructions where the valve in seating turns with respect to the seat. Second, by means of the controlling inlet sleeve, water from the source of supply will be shut off by a quarter turn of the faucet body to the left in relation to the sleeve. This obviates the inconvenience of having to turn off the general supply of water. The cooperation of my particular construction of inlet and outlet valves for the faucet results in a particularly tight, leak-proof construction. The direct seating of the outlet control valve brings about a particularly tight seating as well as extending the life of the valve, and the inlet control permits the shutting off of any pressure from the outlet valve by the mere quarter turning of the faucet with respect to the sleeve 17, permitting any tightening or repairing of the outlet control valve without interference of the water supply and without the necessity of making a general shutting off of the water supply.

I claim:

1. In a faucet including a casing having a passageway therethrough, a sleeve fitted longitudinally into the inlet end of said passageway, said sleeve having a closed inner end, the outer end of said sleeve being open and being positioned adjacent the inlet end of said passageway, said sleeve being formed with a port opening adjacent its closed inner end communicating with said passageway, said sleeve being relatively rotatable with respect to said casing, said sleeve having a flanged end overlapping the inlet end of said passageway and forming a continuation of said casing, and screw threads formed on the periphery of said flanged end and on the adjacent portion of said casing for attaching the faucet to a supply pipe.

2. In a faucet including a casing having a passageway therethrough, a sleeve fitted longitudinally into the inlet end of said passageway, said sleeve having a closed inner end, the outer end of said sleeve being open and being positioned adjacent the inlet end of said passageway, said sleeve being formed with a port opening adjacent its closed inner end communicating with said passageway, said sleeve being relatively rotatable with respect to said casing, said sleeve having a flanged end overlapping the inlet end of said passageway and forming a continuation of said casing, screw threads formed on the periphery of said flanged end and on the adjacent portion of said casing for attaching the faucet to a supply pipe, and opposed stops on the abutting faces of the inlet end of said passageway and the flanged end of said sleeve for limiting the relative rotation of said sleeve and casing in one direction.

CHARLES J. BROWN.